US011509546B2

(12) United States Patent
Eklöf et al.

(10) Patent No.: US 11,509,546 B2
(45) Date of Patent: Nov. 22, 2022

(54) METHOD FOR FEEDBACK OF STREAMING SESSION

(71) Applicant: Telefonaktiebolaget LM Ericsson (publ), Stockholm (SE)

(72) Inventors: Cecilia Eklöf, Täby (SE); Nicklas Johansson, Brokind (SE); Robert Petersen, Linköping (SE); Nianshan Shi, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 94 days.

(21) Appl. No.: 16/754,245

(22) PCT Filed: Oct. 3, 2018

(86) PCT No.: PCT/IB2018/057698
§ 371 (c)(1),
(2) Date: Apr. 7, 2020

(87) PCT Pub. No.: WO2019/073340
PCT Pub. Date: Apr. 18, 2019

(65) Prior Publication Data
US 2020/0280498 A1 Sep. 3, 2020

Related U.S. Application Data

(60) Provisional application No. 62/570,997, filed on Oct. 11, 2017.

(51) Int. Cl.
*H04L 41/5067* (2022.01)
*H04L 65/80* (2022.01)
*H04W 24/10* (2009.01)

(52) U.S. Cl.
CPC .......... *H04L 41/5067* (2013.01); *H04L 65/80* (2013.01); *H04W 24/10* (2013.01)

(58) Field of Classification Search
None
See application file for complete search history.

(56) References Cited

U.S. PATENT DOCUMENTS

2012/0311126 A1\* 12/2012 Jadallah ........... H04N 21/23805
709/224
2012/0315949 A1\* 12/2012 Zhang ................ H04W 24/08
455/525
(Continued)

FOREIGN PATENT DOCUMENTS

WO 2011056673 A1 5/2011
WO 2017054935 A1 4/2017

OTHER PUBLICATIONS

International Search Report and Written Opinion of the International Searching Authority for PCT International Application No. PCT/IB2018/057698 dated Nov. 23, 2018.
(Continued)

*Primary Examiner* — Diane L Lo
(74) *Attorney, Agent, or Firm* — Sage Patent Group

(57) ABSTRACT

A method of operating a UE to provide feedback on a streaming session. The method includes determining when a streaming session used by an application layer of the UE is being started and/or ended. Responsive to the determination, the method transmits an indication to a RAN that the streaming session is being started and/or ended. A corresponding method of operating a network node is provided to control reporting relating to streaming sessions of UEs. The method by the network node receives an indication from an UE that a streaming session is being started and/or ended, and controls whether a Quality of Experience (QoE) configuration file is sent to the UE responsive to the indication.

27 Claims, 4 Drawing Sheets

(56) References Cited

U.S. PATENT DOCUMENTS

| | | | | |
|---|---|---|---|---|
| 2013/0286868 | A1* | 10/2013 | Oyman | H04W 24/06 370/252 |
| 2015/0043336 | A1* | 2/2015 | Zhu | H04W 28/0268 370/230 |
| 2015/0304378 | A1* | 10/2015 | Bi | H04L 65/4076 370/329 |
| 2016/0014184 | A1* | 1/2016 | Rehan | H04B 7/0452 709/219 |
| 2017/0289047 | A1* | 10/2017 | Szilágyi | H04L 41/5067 |
| 2018/0083886 | A1* | 3/2018 | Peitzer | H04N 21/64746 |
| 2020/0162949 | A1* | 5/2020 | He | H04L 41/0896 |

OTHER PUBLICATIONS

Ericsson, "Solution enhancement for QoE Measurements," 3GPP TSG RAN WG2 #99bis, Prague, Czech Republic, Oct. 9-13, 2017, R2-1711832, 4 pages.

3GPP TS 28.404 V0.1.0, "3rd Generation Partnership Project; Technical Specification Group Services and System Aspects; Telecommunication management; Quality of Experience (QoE) measurement collection; Concepts, use cases and requirements (Release 15)," Technical Specification, Aug. 29, 2017, 12 pages.

Ericsson, "Further discussion on QoE for streaming services in E-UTRAN," 3GPP TSG-RAN WG3 Meeting #97bis, Prague, Czech Republic, Oct. 9-13, 2017, R3-173986, 2 pages.

Huawei (Email rapporteur), "Summary on [99#39][LTE/QMC] RAN controlled CP based solution," 3GPP TSG-RAN WG2 #99bis, Prague, Czech, Oct. 9-13, 2017, R2-1710708, 8 pages.

3GPP TS 36.331 V14.4.0, "3rd Generation Partnership Project; Technical Specification Group Radio Access Network; Evolved Universal Terrestrial Radio Access (E-UTRA); Radio Resource Control (RRC); Protocol specification (Release 14)," Technical Specification, Sep. 26, 2017, 753 pages.

3GPP TS 26.247 V14.3.0, "3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 14)," Technical Specification, Sep. 22, 2017, 106 pages.

First Examination Report dated Nov. 5, 2021 for Indian Patent Application No. 202047019221, 6 pages.

3GPP TS 26.247 v15.0.0; "Transparent end-to-end Packet-switched Streaming Service; Progressive Download and Dynamic Adaptive Streaming over HTTP (3GP-DASH) (Release 15)"; Sep. 2017, 128 pages.

\* cited by examiner

```
UEAssistanceInformation-v15xy-IEs ::=     SEQUENCE  {
    streamingIndication-r15               ENUMERATED {true}    OPTIONAL,
    nonCriticalExtension                  SEQUENCE {}          OPTIONAL
}
```

METHOD FOR FEEDBACK OF STREAMING SESSION

CROSS REFERENCE TO RELATED APPLICATIONS

This application is a 35 U.S.C. § 371 national stage application of PCT International Application No. PCT/IB2018/057698 filed on Oct. 3, 2018, which claims the benefit of U.S. Provisional Patent Application Ser. No. 62/570,997, filed on Oct. 11, 2017, the disclosures and content of which are incorporated by reference herein in their entireties.

TECHNICAL FIELD

The present disclosure relates to methods and operations by network nodes and user equipments for providing feedback on a streaming session in a wireless communications system.

BACKGROUND

In 3GPP release 14 there is a work item for "Quality of Experience (QoE) Measurement Collection" for a Universal Mobile Telecommunications System (UMTS). A corresponding work item is approved for Long Term Evolution (LTE) in release 15 and later it will also applicable for New Radio (NR). The purpose of the work item is to start measurements in the User Equipment (UE) to collect information about the quality of streaming services used in the UE. The streaming service is typically a $3^{rd}$ party streaming application on top of a Packet Switched (PS) Interactive Radio Access Bearer (RAB) defined in Radio Access Network (RAN). The purpose of the measurement collection is to be able to improve the quality of the streaming service.

The measurements may be initiated towards RAN directly from an Operations and Maintenance O&M node in a generic way for a group of UEs. They may also be initiated towards RAN by receiving a "trace request" from the core network. The configuration of the measurement includes the measurement details, which is encapsulated in a container that is transparent to RAN, and the address to trace collection entity to which the collected measurements should be sent. The configuration information typically comprises a Dynamic Adaptive Streaming over HTTP (DASH) file specifying how the data is to be collected. The RAN then starts the measurements in the UE by sending the configuration information transparently to the Access Stratum layer in the UE. The end-to-end signaling flow for configuring and reporting the measurements are shown in FIG. 1.

FIG. 1 illustrates an example end-to-end message flow for QoE measurement collection in a Universal Mobile Telecommunications System (UMTS) network.

With reference to the example system of FIG. 1, the current UMTS solution is specified in terms of existing Radio Resource Control (RRC) measurement procedures. The configuration information is carried in a MEASUREMENT CONTROL message in the form of a transparent container. In FIG. 1, a QoE configuration message 100, which is initiated (a) by an Operations Support System (OSS) or Operation and Maintenance (OAM) node, is communicated (b) from the Radio Network Controller (RNC) to the UE through an Universal Terrestrial Radio Access Network (UTRAN) Node B (NB) or other radio access node. An application layer of the UE generates measurement results based on the measurement configuration provided by the QoE configuration message 100. The application layer may be a Dynamic Adaptive Streaming over HTTP (DASH) client that is operated by the UE. The measurement results are carried in a MEASUREMENT REPORT message 102, again in the form of a transparent container. In FIG. 1, a QoE report 100 is communicated (C) from the UE to the RNC via the NB or other radio access node providing radio communications for the RNC with the UE. The RAN is responsible for relaying the results transparently to the trace collection entity. In FIG. 1, the RNC relays (d) the QoE report 102 to a measurement collection entity, such as the example Trace Collection Entity (TCE) shown in FIG. 1, for relay (e) to a QoE Server. For LTE a control plane solution has been agreed, and the configuration container (e.g., 100 in FIG. 1) and the report (e.g., 102 in FIG. 1) will be included in RRC messages. Most likely the configuration container will be part of MeasurementControl and the report in a new message or in MeasurementReport. The corresponding messages for LTE will most likely be RRCConnectionReconfiguration and MeasurementReport, respectively.

When initiated by the core network (CN), the measurement is directed towards a specific UE. The "trace request" referred to above is realized as the S1AP message TRACE START, which carries the configuration information with the measurement details and the IP address to the trace collection entity (TCE) to which the collected measurements should be sent. Similar mechanism exists in UMTS and may be defined for NR as well.

Potential Problems with Existing Solutions

The OAM system which operates to configure QoE measurements has no knowledge about how many streaming sessions are ongoing in the network and has no information about whether the measurements that have been received are reasonable.

Another potential problem is that the RAN also does not know when a streaming session is ongoing for particular UEs and, therefore, the RAN must send the configuration file to all UEs, even if some of the UEs happen to currently not operate with a streaming session.

When the streaming session is ongoing in the application layer the RAN only knows that it is Packet Switched (PS) service and is not aware of the streaming sessions. That means that the Access Stratum (AS) layer has no information about when the actual streaming is ongoing. The Operation and Maintenance (OAM) network node which configured the measurements gets no feedback about how much streaming is ongoing.

The QoE configuration messages can be relatively large, and due to some issues with transferring large files in RRC messages some enhancements may be considered to avoid sending the configuration file very often. In UMTS the configuration file is cleared in the UE when the UE enters idle mode.

Yet another potential problem is that because the RAN initiates the measurement to all the UEs without knowing which have a streaming session, the RAN does not know whether a particular UE currently has a QoE measurement ongoing or not. Another related potential problem is that at RAN overload all UEs that ever have been activated need to be told not to send reports even if they don't have a streaming session ongoing, which would worsen the load in the system. Only UEs that have been activated and have an ongoing streaming session should be told to stop reporting.

SUMMARY

One embodiment of the present disclosure is directed to a method of operating a UE to provide feedback on a streaming session. The method includes determining when a streaming session used by an application layer of the UE is being started and/or ended. Responsive to the determination, the method transmits an indication to a RAN that the streaming session is being started and/or ended.

Potential advantages of this and other embodiments disclosed herein include that an OAM node can use the indication received from the UE to check that the amount of measurement reports is correct. The OAM node can use the indication as a basis for extending or limiting the measured area depending on its determination of how much streaming is ongoing. The indication can be used to determine when a QoE configuration file should be sent to the UE. For example, the network can decide that the configuration file is not to be sent when there is no streaming session, which can result in a significant reduction in the RRC signaling load. The indication could also be used by the RAN to determine if the QoE measurement is started or not during handover, and the RAN can responsively decide whether to pass the QoE measurement related information during handover procedures and which can reduce the associated S1 or X2 signaling.

Another embodiment of the present disclosure is directed to a UE for providing feedback on a streaming session. The UE is configured to determine when a streaming session used by an application layer of the UE is being started and/or ended. Responsive to the determination, the UE transmits an indication to a radio access network, RAN, that the streaming session is being started and/or ended.

Another embodiment of the present disclosure is directed to a corresponding method of operating a network node to control reporting relating to streaming sessions of UEs. The method receives an indication by a UE that a streaming session is being started and/or ended, and controls whether a Quality of Experience, QoE, configuration file is sent to the UE responsive to the indication.

Another embodiment of the present disclosure is directed to a network node that controls reporting relating to streaming sessions of UEs. The network node is configured to receive an indication by a UE that a streaming session is being started and/or ended, and to control whether a QoE configuration file is sent to the UE responsive to the indication.

Another embodiment of the present disclosure is directed to a corresponding method of operating an operations and maintenance (OAM) node to control reporting relating to streaming sessions of UEs. The OAM node receives indications from the RAN/CN node(s) that streaming sessions are being started and/or ended, and controls reporting of QoE measurements of streaming services used by UEs responsive to the indications.

Another embodiment of the present disclosure is directed to an OAM node that controls reporting relating to streaming sessions of UEs. The OAM node is configured to receive indications by UEs that streaming sessions are being started and/or ended, and to control reporting of QoE measurements of streaming services used by UEs responsive to the indications.

Other methods by UEs, network nodes, and OAM nodes, and corresponding apparatuses for UEs, network nodes, and OAM nodes according to embodiments will be or become apparent to one with skill in the art upon review of the following drawings and detailed description. It is intended that all such additional methods by UEs, network nodes, and OAM nodes, and corresponding apparatuses for UEs, network nodes, and OAM nodes be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Figures 1, 3:
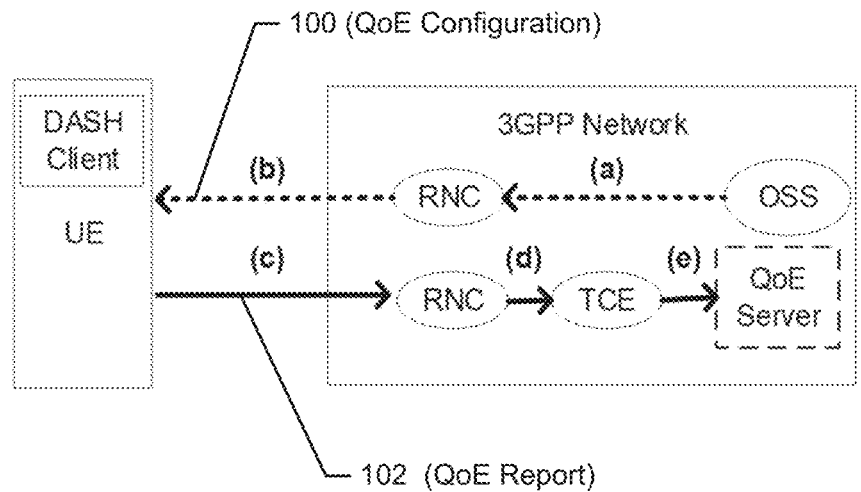
FIG. 1 illustrates end-to-end message flow for QoE measurement collection in a UMTS network.
FIG. 3 illustrates an example UEAssistanceInformation type RRC message that can be used by a UE according to one embodiment of the present disclosure to send the indication that the streaming session is being started and/or ended.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment. Any two or more embodiments described below may be combined in any way with each other. Moreover, certain details of the described embodiments may be modified, omitted, or expanded upon without departing from the scope of the described subject matter.

Various embodiments of the present disclosure are directed to an application layer in a UE that indicates to the Access Stratum (AS) Radio Resource control (RRC) layer in the UE when the streaming session starts and/or ends. The indication is sent from the UE back to Radio Access Network (RAN) which, in turn, sends the indication back to OAM which can use the indication to improve/modify the measured area and other aspects. The indication may also be used by the RAN to decide when the RAN will send a Quality of Experience (QoE) configuration file to the UE. For example, in one embodiment the RAN operates to only send the QoE configuration file when the UE is determined to have a streaming session started. The indication may alternatively or additionally be used by the RAN to determine whether the QoE measurement is started or not during handover, and which determination can be used by the RAN to determine whether to pass the QoE measurement related information during handover procedures.

The embodiments herein are not limited to any particular type of wireless communications system and may be used with, for example, UTRAN, E-UTRAN, and New Radio (NR) wireless communications systems.

Currently only QoE measurements for streaming services have been included in the present specifications, but in later releases other type of application layer measurements may be added. Thus, although various embodiments are described herein the context of QoE-related measurements, these and other embodiments according to the present disclosure can be used with any type of application layer measurements.

Potential Advantages:

Potential advantages of these and other embodiments disclosed herein include that an OAM node can use the indication to check that the amount of measurement reports is correct. The OAM node can use the indication as a basis for extending or limiting the measured area depending on how much streaming that is ongoing. The indication can be used to determine when the configuration file should be sent to the UE. For example, the network can decide that the configuration file is not to be sent when there is no streaming session. This means that the RRC signaling load can be highly reduced. The indication could also be used by the RAN to determine if the QoE measurement is started or not during handover, and the RAN can responsively decide whether to pass the QoE measurement related information during handover procedures and which can reduce the associated S1 or X2 signaling.

Figure 2:
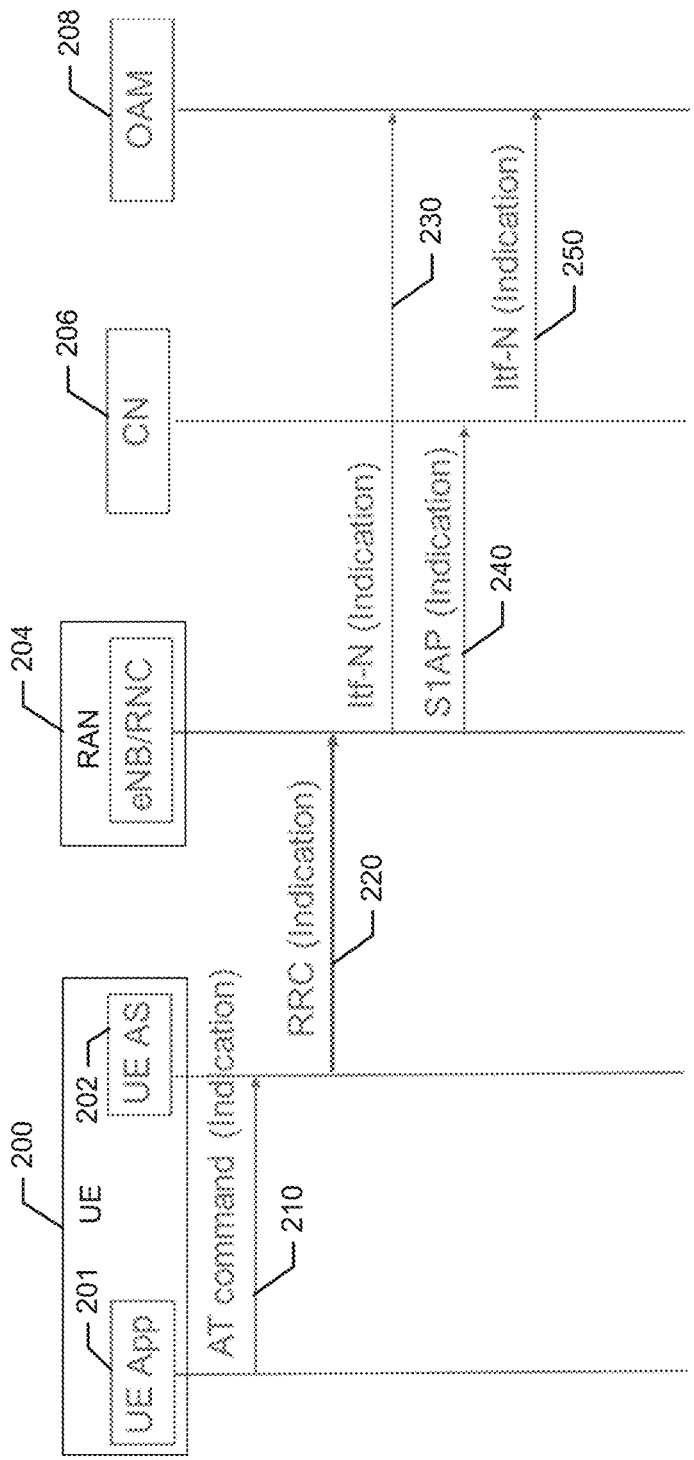
FIG. 2 illustrates a data flow diagram showing operations for forwarding of streaming indications and associated communication data flows that can occur between a UE, a UE Access Stratum (AS) and UE Application Level, a RAN, a CN, and an OAM in accordance with some embodiments of the present disclosure.

Operations by UEs and Network Nodes of a Wireless Communications System:

Various embodiments of the present disclosure will now be explained with reference to the example system of FIG. 2. FIG. 2 illustrates a data flow diagram showing operations for forwarding of streaming indications and associated communication data flows that can occur between a UE 200, a UE Application Layer (201), a UE Access Stratum (AS) 202, a radio access network (RAN) 204, a CN 206, and an OAM 208. The RAN 204 may be, without limitation, an eNB, a Radio Network Controller (RNC), and/or a gNB. The CN 206 may be, without limitation, a Serving General Packet Radio Service (GPRS) Support Node (SGSN), a Mobility Management Entity (MME), and/or an Access and Mobility Management Function (AMF).

Referring to FIG. 2, in one embodiment, when a streaming session starts in the application layer 201 of the UE 200, the application layer sends 201 an indication to the Access Stratum (AS) layer 202 in the UE 200. The application layer 201 can be an application that is configured to receive and use a streaming session and/to send (e.g., relay or generate) a streaming session. Non-limiting examples of an application layer 210 include a Web browser, a streaming media application (e.g., Netflix, DirecTV Now, etc.), a video conference application, etc. The transfer of the indication may be done by means of an Attention (AT) command generated by the application layer 201 and provided to the AS layer 202.

Other ways of providing the indication from the application layer 201 to the AS layer 202 may be used to achieve awareness of an ongoing streaming session at the AS layer 202. For example, the AS layer 202 may monitor communication traffic provided to the application layer 201 and/or monitor application programming interface (API) calls from and/or to the application layer 201 to identify when the application layer is starting and/or ending a streaming session. It is further noted that the indication which is generated may be configured to indicate types of services other than streaming.

The AS layer 202 provides the indication for transmission 220 to the RAN 204 through a radio transceiver interface of the UE 200. The indication may be transmitted in a RRC message, as explained further below. The RAN 204 receives the indication and sends 230 the indication through the CN to the OAM 208 using, for example, a Itf-N message. The RAN 204 may alternatively or additionally send the indication in a S1AP message 240 to the CN 206, which responsively sends the indication to the OAM 208 using a Itf-N message 250.

The OAM 208 can use the indication as a basis for extending or limiting the measured area depending on how much streaming that is ongoing. The OAM 208 may alternatively or additionally use the indication to know when a configuration file for a streaming session should be sent to the UE that originated the indication. The OAM 208 may thereby operate to not send the configuration file to the UE when the UE does not have an ongoing streaming session. The OAM 208 may additionally or alternatively send the configuration file to only UEs that have ongoing streaming sessions, and not to other UEs that don't have ongoing streaming sessions.

Figure 4:
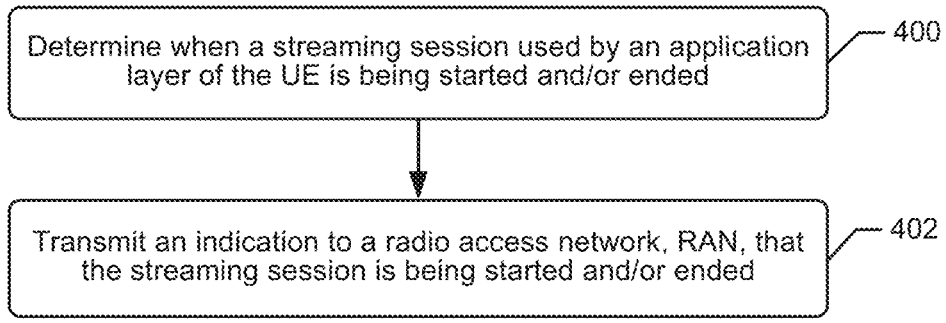
FIG. 4 illustrates a flowchart of operations that can be performed by a UE in accordance with some embodiments of the present disclosure.

FIG. 4 is a corresponding flowchart of operations performed by the UE 200. The UE 200 determines 400 when a streaming session used by an application layer of the UE 200 is being started and/or ended. Responsive to the determination 400, the UE transmits 402 an indication to the RAN 204 that the streaming session is being started and/or ended.

In one embodiment, the indication is sent by the UE indicating when a streaming session is started, and no indication is sent when the streaming session is ended. In another embodiment, the indication is sent by the UE indicating when a streaming session is ended, and no indication is sent when the streaming session is started. In yet another embodiment, the indication is sent by the UE indicating when a streaming session is started and another indication is sent by the UE indicating when the streaming session is ended.

With reference to FIGS. 2 and 4, in a further embodiment, the UE 200 sends 220 the indication to the RAN 204 in an RRC message. The UE may send the indication to the RAN 204 (e.g., eNB) as a UEAssistanceInformation message, a MeasurementReport message, or in another type of message. FIG. 3 illustrates an example UEAssistanceInformation type RRC message that can be used by a UE according to one embodiment to send the indication that the streaming session is being started and/or ended.

The indication can be used by the RAN 204 to determine when to send the QoE configuration file, to avoid sending it to UEs which don't have a present streaming session or an ongoing streaming session. The QoE configuration in this case does not have to be sent to all UEs, but can be sent only to the particular UEs which have sent the streaming indication indicating that a streaming session has started (e.g., determining that the streaming session is started and has not yet been ended). There may be a slight delay in starting the measurements in such a solution, but the delay can be considered as small and the amount of RRC signaling is highly reduced.

Figure 5:
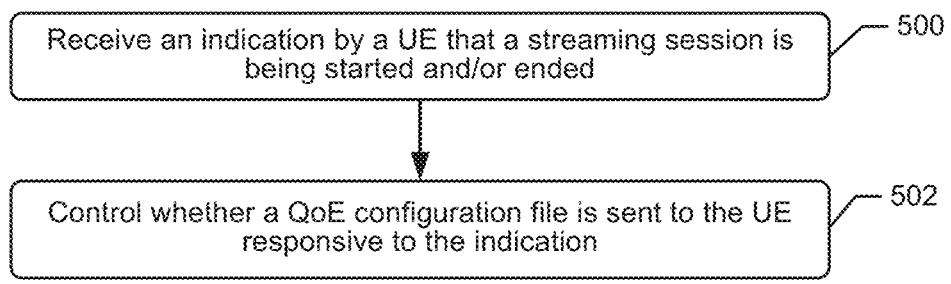
FIG. 5 illustrates a flowchart of operations that can be performed by a network node in accordance with some embodiments of the present disclosure.

FIG. 5 is a corresponding flowchart of operations performed by a network node, such as the RAN 204, to control reporting relating to streaming sessions of UEs. The network node receives 500 an indication by a UE that a streaming session is being started and/or ended. The network node controls whether a QoE configuration file is sent to the UE responsive to the indication.

In a further embodiment, the network node sends the QoE configuration file to the UE responsive to determining that the indication indicates that a streaming session is being started with the UE. In another further embodiment, the network node sends the QoE configuration file to all UEs from which it has received indications which indicate that the UEs have ongoing streaming sessions. The network node can prevent sending of a QoE configuration file to any UE from which it has not received an indication that a streaming session has been started (e.g., following occurrence of a defined event, such as when a last indication of an ongoing streaming session was received form the UE) and/or any UE for which it has received an indication that a streaming session has ended.

In another further embodiment, the RAN 204 forwards 230 the indication in a ltf-N message to an Operation and Maintenance (OAM) node.

In another further embodiment, the RAN 204 (e.g. eNB, RNC, gNB) forwards the indication to the CN 206 (e.g., Serving GPRS Support Node (SGSN), Mobility Management Entity (MME), Access and Mobility Management Function (AMF)). The eNB or other type of RAN 204 may send the indication to a MME in S1AP messages (e.g. HANDOVER REQUIRED, or class 2 messages for example CELL TRAFFIC TRACE).

In another further embodiment, the indication is forwarded to the OAM system (e.g. OSS, Network Management (NM), Domain Manager (DM), Element Manager (EM)) by either the RAN 204 (e.g., eNB, RNC, gNB) or the CN node 208 (e.g SGSN, MME, AMF) in a notification.

The QoE configuration file can contain information which is used by the receiving UE(s) to configure its (their) measurement of streaming services used in the UE. The information in the QoE configuration file can contain an address (e.g., network address) of a trace collection entity to which the collected measurements are to be sent (reported) by the UE 200. The QoE configuration file may be or include a DASH file specifying how measurement data is to be collected by the UE, and may contain an address for where the measurement data is to be sent (reported). These operations may include one or more of the operations described above with regard to FIG. 1, which are incorporated herein without duplication for brevity.

The indication can be used by the OAM 206 to verify whether the number of QoE reports that have been generated are reasonable according to a defined rule. The indication can alternatively or additionally be used as a basis for extending or limiting the QoE configured area if the number of sessions is too small or too large based on a defined rule. The indication can alternatively or additionally be used to terminate a session if sufficient information and/or if a sufficient number of recorded sessions are deemed to be sufficient based on a defined rule.

Figure 6:
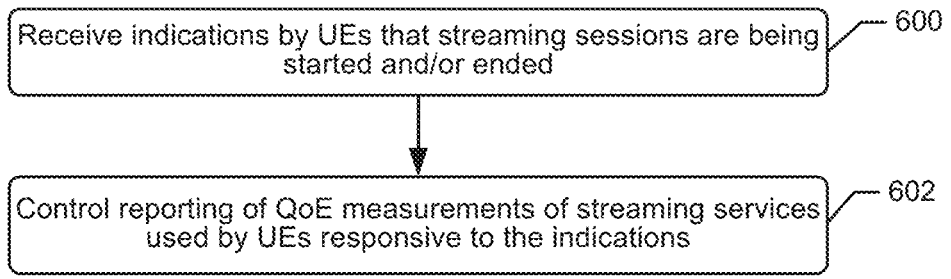
FIG. 6 illustrates a flowchart of operations that can be performed by an OAM node in accordance with some embodiments of the present disclosure.

FIG. 6 is a corresponding flowchart of operations performed by an OAM node (also referred to as OAM), such as the OAM 206, to control reporting relating to streaming sessions of UEs. Referring to FIG. 6, an OAM node receives 600 indications from the RAN/CN node(s) that streaming sessions are being started and/or ended. The OAM controls 602 reporting of Quality of Experience, QoE, measurements of streaming services used by UEs responsive to the indications.

In a further embodiment, the OAM performs the control 602 by verifying whether a number of QoE reports received from UEs satisfies a defined rule.

In a further embodiment, the OAM performs the control 602 by extending or limiting a QoE configured area when the number of sessions is too small or too large based on a defined rule.

In a further embodiment, the OAM triggers termination of a streaming session if sufficient information and/or a sufficient number of recorded sessions are deemed to be sufficient based on a defined rule.

As explained above, the indication could also be generated by a UE responsive to start-up of a streaming session, during an ongoing streaming session, and/or responsive to ending a streaming session.

Moreover, as explained above, separate indications can be sent by a UE to indicate the start of a streaming session and to separately indicate an end of a streaming session.

Terminology:

In some embodiments, a more general term "network node" is used and it can correspond to any type of radio network node or any network node, which communicates with a UE and/or with another network node. Examples of network nodes are MN, SN, UPF, AMF, OAM, and OSS. Example network nodes may further include NodeB, Master eNB (MeNB), Secondary eNB (SeNB), a network node belonging to Master Cell Group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Unit (RRH), nodes in distributed antenna system (DAS), core network node (e.g. Mobile Switching Center (MSC), Mobility Management Entity (MME), etc), O&M, OSS, TCE, Self Organizing Network (SON), positioning node (e.g. E-SMLC), MDT, etc.

In some embodiments, the non-limiting term user equipment (UE) is used and it refers to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, ProSe UE, Vehicle-to-Vehicle (V2V) UE, Vehicle-to-Anything (V2X) UE, etc.

In some embodiments, the non-limiting term WAN (wireless access network or RAN, radio access network) node is used. The WAN node can be a UE (e.g. D2D UE) or a network node (e.g. access point, BS etc). The WAN node is also interchangeably called as cellular node, NW source node etc.

The term time resource used herein may correspond to any type of physical resource or radio resource expressed in terms of length of time. Examples of time resources are: symbol, time slot, subframe, radio frame, Transmission Time Interval (TTI), interleaving time etc.

The embodiments are described for 5G. However, the embodiments are applicable to any Radio Access Technology (RAT) or multi-RAT systems, where the UE receives and/or transmit signals (e.g. data) e.g. LTE Frequency Division Duplex (FDD)/Time Division Duplex (TDD), Wide Code Division Multiplexing Access (WCDMA)/High Speed Packet Access (HSPA), Global System for Mobile communication (GSM)/GSM EDGE Radio Access Network (GERAN), Wi Fi, Wide Local Area Network (WLAN), CDMA2000, 5G, NR, etc.

Figure 7:
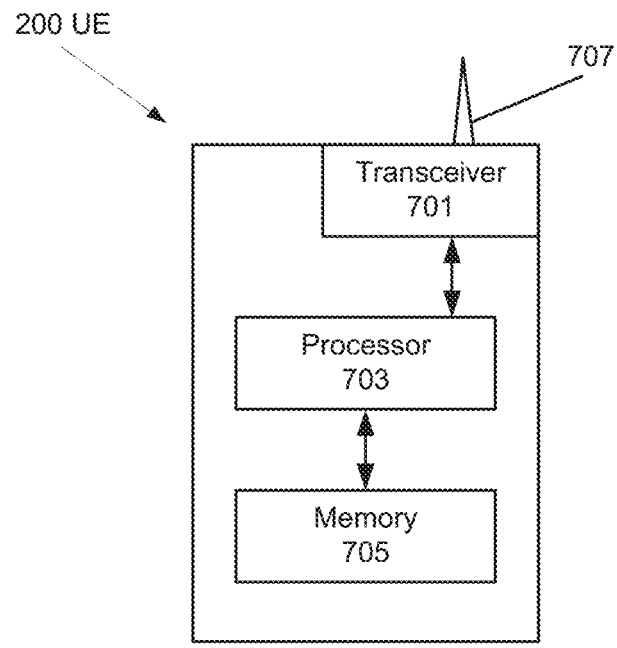
FIG. 7 illustrates elements of a UE which may be configured to operate according to some embodiments of the present disclosure.

Example Elements of UE and Network Node:

FIG. 7 is a block diagram illustrating elements of a UE 200 (also referred to as a wireless terminal, a wireless communication device, a wireless communication terminal, user equipment, a user equipment node/terminal/device, etc.) configured to operate according to embodiments disclosed herein. As shown, the UE 200 may include an antenna 707, and a transceiver circuit 701 (also referred to as a transceiver) including a transmitter and a receiver configured to provide uplink and downlink radio communications with a base station or other radio transceiver element of a radio access network. The UE 200 may also include at least one processor circuit 703 (also referred to as a processor) coupled to at least one transceiver circuit 701 (also referred to as a transceiver), and at least one memory circuit 705 (also referred to as memory) coupled to the processor circuit. The memory 705 may include computer readable program code that when executed by the processor 703 causes the processor 703 to perform operations according to embodiments disclosed herein for a UE. According to other embodiments, processor 703 may be defined to include memory so that a separate memory circuit is not required. The UE 200 may also include an interface (such as a user interface) coupled with processor 703.

As discussed herein, operations of the UE 200 may be performed by processor 703 and/or transceiver 701. Alternatively, or additionally, the UE 200 may include modules, e.g., circuitry, that performs respective operations (e.g., operations discussed herein with respect to example embodiments of UEs).

Figure 8:
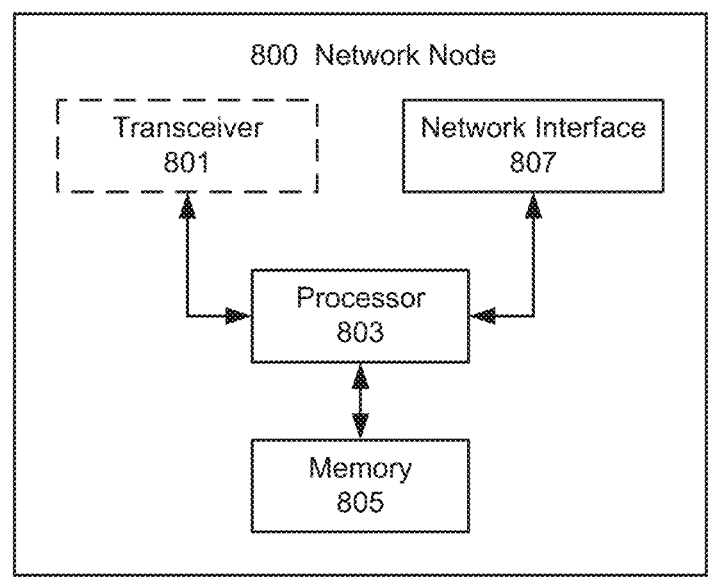
FIG. 8 illustrates elements of a network node which may be configured to operate according to some embodiments of the present disclosure.

FIG. 8 is a block diagram illustrating elements of a network node 800 which may correspond to any one or more of the RAN 204, CN 206, and OAM 208 of FIGS. 1, 2, 5 and 6 according to one or more embodiments disclosed herein. As shown, the network node 800 may include at least one transceiver circuit 801 (also referred to as a transceiver) including a transmitter and a receiver configured to provide uplink and downlink radio communications with UEs. The network node 800 may include at least one network interface circuit 807 (also referred to as a network interface) configured to provide communications with other network nodes, such as one or more nodes of a RAN, a CN, and/or an OAM. The network node 800 may also include at least one processor circuit 803 (also referred to as a processor) coupled to the transceiver 801 (when included), and at least one memory circuit 805 (also referred to as memory) coupled to the processor 803. The memory 805 may include computer readable program code that when executed by the processor 805 causes the processor 805 to perform operations according to embodiments disclosed herein for a network node, such as any one or more of the RAN 204, CN 206, and OAM 208 of FIGS. 1, 2, 5 and 6. According to other embodiments, processor 803 may be defined to include memory so that a separate memory circuit is not required.

As discussed herein, operations of the network node 800 may be performed by processor 803, network interface 807, and/or transceiver 801. For example, processor 803 may control transceiver 801 to transmit communications through transceiver 801 over a radio interface to one or more UEs and/or to receive communications through transceiver 801 from one or more UEs over a radio interface. Similarly, processor 803 may control network interface 807 to send communications through network interface 807 to one or more other network nodes and/or to receive communications through network interface 807 from one or more other network nodes. Alternatively, or additionally, the network node 800 may include modules, e.g., circuitry, that performs respective operations (e.g., operations discussed herein with respect to example embodiments of network nodes).

In some embodiments, some or all of the operations described herein, e.g., for a UE, network node or OAM node, may be implemented as virtual components executed by one or more virtual machines implemented in one or more virtual environments hosted by one or more of network nodes. Further, in embodiments in which the virtual node is not a radio access node or does not require radio connectivity (e.g., a core network node), then the network node may be entirely virtualized.

The operations may be implemented by one or more applications (which may alternatively be called software instances, virtual appliances, network functions, virtual nodes, virtual network functions, etc.) operative to implement some of the features, functions, and/or benefits of some of the embodiments disclosed herein. Applications are run in a virtualization environment which provides hardware comprising processing circuitry and memory. Memory contains instructions executable by processing circuitry whereby application is operative to provide one or more of the features, benefits, and/or functions disclosed herein.

Abbreviations:

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5GC 5G Core Network
AMF Access and Mobility Management Function
AS Access Stratum
AT Attention
CN Core Network
DASH Dynamic Adaptive Streaming over HTTP
DM Domain Manager
DRB Data Radio Bearer
eNB E-UTRAN Node B
EM Element Manager
E-UTRAN Evolved Universal Terrestrial Radio Access Network
GPRS General Packet Radio Service (
gNB gNode B (a Node B supporting NR and connectivity to NGC)
HSPA High-Speed Packet Access
LTE Long Term Evolution
MCG Master Cell Group
MeNB Master eNB
MDT Minimization of Drive Tests
MME Mobility Management Entity
MSC Mobile Switching Center
NGC Next Generation Core
NM Network Management
NR New Radio
O&M Operation and Maintenance
OAM Operation and Maintenance
OSS Operations Support System
PS Packet Switched
QoE Quality of Experience
RAB Radio Access Bearer
RAN Radio Access Network
RANAP Radio Access Network Application Part
RNC Radio Network Controller
RRH Remote Radio Head RRU Remote Radio Unit
S1AP S1 Application Protocol
SCG Secondary Cell Group
NGAP NG Application Protocol
RNC Radio Network Controller
RRC Radio Resource Control
SeNB Secondary eNB
SGSN Serving GPRS Support Node
SRB Signaling Radio Bearer
TCE Trace Collection Entity
UE User Equipment
UMTS Universal Mobile Telecommunications System
UTRAN Universal Terrestrial Radio Access Network
XML Extensible Markup Language Listing of Embodiments Embodiment 1. A method of operating a user equipment, UE, to provide feedback on a streaming session, the method comprising:
determining (400) when a streaming session used by an application layer of the UE is being started and/or ended; and
responsive to the determining (400), transmitting (210, 402) an indication to a radio access network, RAN, that the streaming session is being started and/or ended.

Embodiment 2. The method of Embodiment 1, wherein the determining (400) comprises:
receiving at an Access Stratum, AS, layer of the UE from the application layer, an indication that a streaming session used by the application layer is being started and/or ended.

Embodiment 3. The method of Embodiment 2, wherein the indication is received at the AS layer as an AT command generated by the application layer.

Embodiment 4. The method of any of Embodiments 1 to 3, wherein the transmitting (210, 402) of the indication to the RAN, comprises:
transmitting the indication to the RAN using an RRC message.

Embodiment 5. The method of Embodiment 4, wherein the indication is transmitted to the RAN using one of a UEAssistanceInformation message and a MeasurementReport message.

Embodiment 6. A computer program product comprising a non-transitory computer readable medium storing program code that when executed by a processor of a user equipment, UE, causes the UE to perform operations of the method of any of Embodiments 1-5.

Embodiment 7. A user equipment, UE, adapted to perform the method of any of Embodiments 1-5.

Embodiment 8. A user equipment, UE, for providing feedback on a streaming session, the UE configured to:
determine when a streaming session used by an application layer of the UE is being started and/or ended; and
responsive to the determination, transmit an indication to a radio access network, RAN, that the streaming session is being started and/or ended.

Embodiment 9. The UE of Embodiment 8 further configured to perform the method of any of Embodiments 2-5.

Embodiment 10. A method of operating a network node to control reporting relating to streaming sessions of UEs, the method comprising:
receiving (500) an indication by a UE that a streaming session is being started and/or ended; and
controlling (502) whether a Quality of Experience, QoE, configuration file is sent to the UE responsive to the indication.

Embodiment 11. The method of Embodiment 10, wherein the controlling (502) comprises:
sending the QoE configuration file to the UE responsive to determining that the indication indicates that a streaming session is being started.

Embodiment 12. The method of any of Embodiments 10 to 11, wherein the controlling (502) comprises:
sending the QoE configuration file to all UEs from which the network node has received indications that the UEs have ongoing streaming sessions.

Embodiment 13. The method of any of Embodiments 10 to 12, wherein the controlling (502) comprises:
preventing sending of a QoE configuration file to any UE from which it has not received an indication that a streaming session has been started and/or any UE for which it has received an indication that a streaming session has ended.

Embodiment 14. The method of any of Embodiments 10 to 13, wherein the controlling (502) comprises:
forwarding (230) the indication in a Itf-N message to an Operation and Maintenance (OAM) node.

Embodiment 15. The method of any of Embodiments 10 to 14, wherein the controlling (502) comprises:
forwarding (240) the indication in a S1AP message to a core network, CN, for relay to an Operation and Maintenance (OAM) node.

Embodiment 16. The method of Embodiment 15, wherein the indication is forwarded to a mobility management entity in a HANDOVER REQUIRED message and/or in CELL TRAFFIC TRACE message.

Embodiment 17. The method of any of Embodiments 10 to 16, wherein the method is performed by a E-UTRAN Node B, eNB, a radio network controller, RNC, and/or a gNode B.

Embodiment 18. A computer program product comprising a non-transitory computer readable medium storing program code that when executed by a processor of a network node causes the network node to perform operations of the method of any of Embodiments 10-17.

Embodiment 19. A network node adapted to perform the method of any of Embodiments 10-17.

Embodiment 20. A network node that controls reporting relating to streaming sessions of UEs, the network node configured to:
receive an indication by a UE that a streaming session is being started and/or ended; and
control whether a Quality of Experience, QoE, configuration file is sent to the UE responsive to the indication.

Embodiment 21. The network node of Embodiment 20 further configured to perform the method of any of Embodiments 10-17.

Embodiment 22. A method of operating an operations and maintenance node to control reporting relating to streaming sessions of user equipments, UEs, the method comprising:
receiving (600) indications by UEs that streaming sessions are being started and/or ended; and
controlling (602) reporting of Quality of Experience, QoE, measurements of streaming services used by UEs responsive to the indications.

Embodiment 23. The method of Embodiment 22, wherein the controlling (602) comprises:
verifying whether a number of QoE reports received from UEs satisfies a defined rule.

Embodiment 24. The method of any of Embodiments 22 to 23, wherein the controlling (602) comprises:
extending or limiting a QoE configured area when the number of sessions is too small or too large based on a defined rule.

Embodiment 25. The method of any of Embodiments 22 to 24, wherein the controlling (602) comprises:

triggering termination of a streaming session if sufficient information and/or if a sufficient number of recorded sessions are deemed to be sufficient based on a defined rule.

Embodiment 26. A computer program product comprising a non-transitory computer readable medium storing program code that when executed by a processor of an operations and maintenance node causes the operations and maintenance node to perform operations of the method of any of Embodiments 22-25.

Embodiment 27. An operations and maintenance node adapted to perform the method of any of Embodiments 22-25.

Embodiment 28. An operations and maintenance node that control reporting relating to streaming sessions of user equipments, UEs, the operations and maintenance node configured to:

receive indications by UEs that streaming sessions are being started and/or ended; and control reporting of Quality of Experience, QoE, measurements of streaming services used by UEs responsive to the indications.

Further Definitions and Embodiments

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

REFERENCES 1. 3GPP TS 36.331, Radio Resource Control (RRC); Protocol specification
2. 3GPP TS 26.247 Dynamic Adaptive Streaming over HTTP

The invention claimed is:

1. A method of operating a user equipment, UE, to provide feedback on a streaming session, the method comprising:
   determining when a streaming session used by an application layer of the UE is being started and/or ended;
   responsive to the determining, transmitting an indication to a radio access network, RAN, that the streaming session is being started and/or ended; and
   only responsive to transmitting an indication to the RAN that the streaming session has been started and has not yet been ended, receiving a quality of experience, QoE, configuration file from the RAN.

2. The method of claim 1, wherein the determining comprises:
   receiving at an Access Stratum, AS, layer of the UE from the application layer, an indication that a streaming session used by the application layer is being started and/or ended.

3. The method of claim 2, wherein the indication is received at the AS layer as an AT command generated by the application layer.

4. The method of claim 1, wherein the transmitting of the indication to the RAN, comprises:
   transmitting the indication to the RAN using an RRC message.

5. The method of claim 4, wherein the indication is transmitted to the RAN using one of a UEAssistanceInformation message and a MeasurementReport message.

6. A computer program product comprising a non-transitory computer readable medium storing program code that when executed by a processor of a user equipment, UE, causes the UE to perform operations of the method of claim 1.

7. A user equipment, UE, adapted to perform the method of claim 1.

8. A user equipment, UE, for providing feedback on a streaming session, the UE configured to:
   determine when a streaming session used by an application layer of the UE is being started and/or ended
   responsive to the determination, transmit an indication to a radio access network, RAN, that the streaming session is being started and/or ended; and
   only responsive to transmitting an indication to the RAN that the streaming session has been started and has not yet been ended, receiving a quality of experience, QoE, configuration file from the RAN.

9. A method of operating a network node to control reporting relating to streaming sessions of UEs, the method comprising:
   receiving an indication by a UE that a streaming session is being started and/or ended;
   controlling whether a Quality of Experience, QoE, configuration file is sent to the UE responsive to the indication; and
   only responsive to receiving an indication by the UE that the streaming session has been started and has not yet been ended, signalling the QoE configuration file to the UE.

10. The method of claim 9, wherein the controlling comprises:
    sending the QoE configuration file to the UE responsive to determining that the indication indicates that a streaming session is being started.

11. The method of claim 9, wherein the controlling comprises:
    sending the QoE configuration file to all UEs from which the network node has received indications that the UEs have ongoing streaming sessions.

12. The method of claim 9, wherein the controlling comprises:
    preventing sending of a QoE configuration file to any UE from which it has not received an indication that a streaming session has been started and/or any UE for which it has received an indication that a streaming session has ended.

13. The method of claim 9, wherein the controlling comprises:
    forwarding the indication in a Itf-N message to an Operation and Maintenance (OAM) node.

14. The method of claim 9, wherein the controlling comprises:

forwarding the indication in a S1AP message to a core network, CN, for relay to an Operation and Maintenance (OAM) node.

15. The method of claim 14, wherein the indication is forwarded to a mobility management entity in a HANDOVER REQUIRED message and/or in CELL TRAFFIC TRACE message.

16. The method of claim 9, wherein the method is performed by a E-UTRAN Node B, eNB, a radio network controller, RNC, and/or a gNode B.

17. A computer program product comprising a non-transitory computer readable medium storing program code that when executed by a processor of a network node causes the network node to perform operations of the method of claim 9.

18. A network node adapted to perform the method of claim 9.

19. A network node that controls reporting relating to streaming sessions of UEs, the network node configured to:
receive an indication by a UE that a streaming session is being started and/or ended; and
control whether a Quality of Experience, QoE, configuration file is sent to the UE responsive to the indication; and
only responsive to receiving an indication by the UE that the streaming session has been started and has not yet been ended, signalling the QoE configuration file to the UE.

20. A method of operating an operations and maintenance node to control reporting relating to streaming sessions of user equipments, UEs, the method comprising:
receiving indications from a RAN or CN node that streaming sessions are being started and/or ended; and
controlling reporting of Quality of Experience, QoE, measurements of streaming services used by UEs responsive to the indications.

21. The method of claim 20, wherein the controlling comprises:
verifying whether a number of QoE reports received from a single or a set of UEs satisfies a defined rule.

22. The method of claim 20, wherein the controlling comprises:
extending or limiting a QoE configured area when the number of sessions is too small or too large based on a defined rule.

23. The method of claim 20, wherein the controlling comprises:
prolonging/shortening the duration of the QoE measurement collection duration when the number of sessions is too small or too large based on a defined rule.

24. The method of claim 20, wherein the controlling comprises:
triggering deactivation of collection of QoE measurement collection associated to a streaming session if sufficient information and/or if a sufficient number of recorded sessions are deemed to be sufficient based on a defined rule.

25. A computer program product comprising a non-transitory computer readable medium storing program code that when executed by a processor of an operations and maintenance node causes the operations and maintenance node to perform operations of the method of claim 20.

26. An operations and maintenance node adapted to perform the method of claim 22.

27. An operations and maintenance node that controls reporting relating to streaming sessions of user equipments, UEs, the operations and maintenance node configured to:
receive indications from a RAN or CN node that streaming sessions are being started and/or ended; and
control reporting of Quality of Experience, QoE, measurements of streaming services used by UEs responsive to the indications.

* * * * *